(12) United States Patent
Rieker et al.

(10) Patent No.: US 9,238,268 B2
(45) Date of Patent: Jan. 19, 2016

(54) SPINDLE/TOOL COMBINATION FOR A MACHINE TOOL

(71) Applicant: MAG IAS GmbH, Goeppingen (DE)

(72) Inventors: Hartmut Rieker, Salach (DE); Thomas Bayha, Markgroeningen (DE)

(73) Assignee: MAG IAS GmbH, Goeppingen (DE)

( * ) Notice: Subject to any disclaimer, the term of this patent is extended or adjusted under 35 U.S.C. 154(b) by 413 days.

(21) Appl. No.: 13/763,194

(22) Filed: Feb. 8, 2013

(65) Prior Publication Data

US 2013/0147130 A1 Jun. 13, 2013

Related U.S. Application Data

(63) Continuation of application No. PCT/EP2011/061370, filed on Jul. 6, 2011.

(30) Foreign Application Priority Data

Aug. 9, 2010 (DE) .......................... 10 2010 039 096

(51) Int. Cl.
| | | |
|---|---|---|
| *B23B 29/034* | (2006.01) | |
| *B23B 31/10* | (2006.01) | |
| *B23B 31/26* | (2006.01) | |
| *B23Q 3/157* | (2006.01) | |

(Continued)

(52) U.S. Cl.
CPC ........... *B23B 31/10* (2013.01); *B23B 29/03446* (2013.01); *B23B 31/265* (2013.01); *B23Q 3/12* (2013.01); *B23Q 3/15713* (2013.01); *B24B 33/105* (2013.01); *B23B 2260/034* (2013.01); *Y10T 279/12* (2015.01); *Y10T 279/275* (2015.01); *Y10T 409/30952* (2015.01); *Y10T 409/309464* (2015.01)

(58) Field of Classification Search
CPC .................. B23B 29/03417; B23B 29/03432; B23B 29/0345; B23B 29/03446; B23B 29/03453; B23B 29/034; B23B 31/26; B23B 31/261; B23B 31/263; B23B 31/265; Y10T 409/309464; Y10T 409/309408; Y10T 409/309352
IPC ....................................................... B23B 29/034
See application file for complete search history.

(56) References Cited

U.S. PATENT DOCUMENTS

| | | |
|---|---|---|
| 5,346,344 A | 9/1994 | Kress et al. |
| 5,443,340 A | 8/1995 | Reinauer et al. |

(Continued)

FOREIGN PATENT DOCUMENTS

| | | |
|---|---|---|
| DE | 44 30 113 A1 | 2/1996 |
| DE | 10 2006 028 728 A1 | 12/2007 |

(Continued)

*Primary Examiner* — Daniel Howell
(74) *Attorney, Agent, or Firm* — Womble Carlyle Sandridge & Rice, LLP

(57) ABSTRACT

A spindle/tool combination for a machine tool is provided, including a tool, a spindle, on which the tool can be releasably fixed and by means of which the tool can be rotated, wherein the tool has at least one linearly movable rod and the spindle comprises a loading device, which acts on the at least one linearly movable rod of the tool, and a pull/push coupling device, by means of which the at least one rod of the tool can be coupled to the loading device, the at least one rod being actuable by means of the loading device by pushing and pulling when coupled, wherein the pull/push coupling device comprises a clamping jaw and the clamping jaw is arranged in the tool.

43 Claims, 10 Drawing Sheets

(51) Int. Cl.
*B24B 33/10* (2006.01)
*B23Q 3/12* (2006.01)

(56) References Cited

U.S. PATENT DOCUMENTS

| | | | |
|---|---|---|---|
| 5,782,586 | A | 7/1998 | Geissler |
| 6,345,937 | B1 | 2/2002 | Kress et al. |
| 7,070,491 | B2 | 7/2006 | Becksvoort |
| 2009/0270020 | A1 | 10/2009 | Klein et al. |
| 2010/0105292 | A1 | 4/2010 | Nagel et al. |
| 2010/0201083 | A1 | 8/2010 | Hangleiter |

FOREIGN PATENT DOCUMENTS

| | | |
|---|---|---|
| DE | 20 2008 010 140 U1 | 11/2008 |
| DE | 10 2007 045 045 A1 | 3/2009 |
| DE | 10 2010 002 019 A1 | 8/2011 |
| EP | 1 616 665 A1 | 1/2006 |
| JP | 07024610 A * | 1/1995 |
| JP | 10080805 A * | 3/1998 |
| JP | 10080806 A * | 3/1998 |
| JP | 2003275933 A * | 9/2003 |
| JP | 2009208160 A * | 9/2009 |
| JP | 2010179399 A * | 8/2010 |

* cited by examiner

SPINDLE/TOOL COMBINATION FOR A MACHINE TOOL

CROSS-REFERENCE TO RELATED APPLICATION

This application is a continuation of international application number PCT/EP2011/061370, filed on Jul. 6, 2011, and claims the benefit of German application number 10 2010 039 096.8, filed on Aug. 9, 2010, which are each incorporated herein by reference in their entirety and for all purposes.

BACKGROUND OF THE INVENTION

The invention relates to a spindle/tool combination for a machine tool, comprising a tool, a spindle, on which the tool is releasably fixable and by means of which the tool is rotatable, the tool having at least one linearly movable rod and the spindle comprising a loading device, which acts on the at least one linearly movable rod of the tool, and a pull/push coupling device, by means of which the at least one rod of the tool is couplable to the loading device, the at least one rod being actuable by the loading device by pushing and pulling when coupled.

A honing spindle is known from DE 10 2006 007 704 A1, having a shaft for transmitting forces and torques to a tool body of a honing tool, with a feed rod, which is associated with the shaft and which is provided to apply a machining force to a pressure rod of the honing tool, and with a tool receiver provided on the shaft at the end, said tool receiver being configured for a releasable coupling of the honing tool, at least one adjusting device, which is configured to fix the tool body on the shaft, being associated with the tool receiver.

A honing tool is known from EP 1 616 665 A1, with a tool body and at least one honing stone, which is movable relative to the tool body and can be actuated by an actuating mechanism, and with a coupling device for releasable connection to a honing rod. The coupling device has at least one locking element, which can be actuated from the outside by a holding device for fixing the honing tool.

A machine tool to machine substantially rotationally symmetrical workpieces is known from DE 44 30 113 A1.

A method is known from DE 10 2006 034 497 A1 for the fine machining of internal faces of bores in workpieces by fine drilling and subsequent honing, comprising the steps of fine drilling a bore of a workpiece by means of a fine drilling tool of a fine drilling device and transferring the workpiece into a machining position of a honing device to machine the finely drilled bore by means of a honing tool of the honing device.

A method for machining a workpiece is known from DE 10 2007 045 045 A1, in which the workpiece is fixed to a workpiece carrier of a machine tool and the workpiece, in its state fixed to the workpiece carrier, is pre-machined by means of a preparation tool and the pre-machined workpiece is machined so as to be honed by means of a honing tool.

A honing tool known from DE 10 2006 028 728 A1 for the finishing honing of bores in a workpiece, with at least one honing stone retainer, an adjusting mechanism for adjusting the diameter of the honing tool in the region of the at least one honing stone retainer, an interface for connecting the honing tool to a conventional machine spindle or a conventional adapter, intermediate piece or the like and a drive unit integrated in the honing tool to actuate the adjusting mechanism.

A method is known from DE 198 59 051 A1 for the machine cutting of a workpiece to produce a non-level surface, in particular a valve seat, by means of a tool, with a base body having a cutter plate received by a holder.

A spindle unit for machine tools is known from EP 0 780 192 B2.

A honing tool with a fluid actuator is known from U.S. Pat. No. 7,070,491 B2.

In the not prior published German patent application DE 10 2010 002 019 A1, a machine tool is described, which comprises a spindle, on which a tool can be releasably fixed and by means of which the tool can be rotated. The spindle has a loading device, which acts on at least one linearly movable rod of a tool, when the tool is fixed on the spindle. The spindle comprises a motor device, which is coupled to the loading device and which drives a linear displacement of the at least one rod by means of the loading device.

A tool receiver is known from DE 20 2008 010 140 U1 for receiving a honing tool, which is formed by a tool body, which is provided with an internal channel and in which a feed rod is axially displaceable, and a honing stone retainer, which is radially displaceable in the tool body, which honing tool can be fixed to the honing spindle of a honing machine, in which a coupling piece, which cooperates with the feed rod of the honing tool and on which the feed pin of the honing machine acts, is displaceable in the tool receiver. The tool body is configured as a tube and is clamped in the internal channel of the tool receiver by a clamping jaw, wherein the tool body, secured with respect to rotational position by a rotational position fixing piece, and the coupling piece that is connected to the feed rod, secured with respect to rotational position by a groove/fitted key connection, are guided in the internal channel of the tool receiver.

SUMMARY OF THE INVENTION

In accordance with the invention a spindle/tool combination is provided, by means of which a workpiece can be machined in a variable manner.

In accordance with one embodiment of the invention, in the spindle/tool combination the pull/push coupling device comprises a clamping jaw and the clamping jaw is arranged in the tool.

In the solution in accordance with the invention, a bracing of the at least one rod of the tool with the machining device can be achieved by means of the pull/push coupling device, this bracing being effective both for the forward travel movements (push movements) and for the return travel movements (pull movements).

As a result, each position of the at least one rod of the tool can be adjusted in a defined manner both for the feed and the return travel by means of the loading device of the spindle. As a result, a workpiece can be machined both during the forward travel movement and during the return travel movement.

No resetting device for the at least one rod of the tool has to be integrated in the tool, so the tool can be made more compact.

Complex machining processes can be carried out by a tool having at least one rod, which can be positioned in a defined manner through pushing and through pulling. For example, freeform faces can be machined.

The pull/push coupling device comprises a clamping jaw. The clamping jaw is used to produce a positive connection between the loading device and the at least one rod of the tool. The positive connection can easily be opened or closed, so a tool can easily be removed from the spindle or can be inserted therein. By providing a clamping jaw the spindle can be configured in a simple way; in particular, no control tube has to be provided in the spindle and no rotatable element has to be provided to produce the coupling.

The clamping jaw is arranged in the tool. As a result, a housing of the tool can be used to receive and also support the clamping jaw. The spindle can thus be configured in a simple way. The pull/push coupling device can be at least substantially integrated in the tool. To produce the coupling or to release the coupling, notably only end faces are still required on the spindle and, in particular, no additional movable elements to produce the coupling or release the coupling are necessary on the spindle outside the loading device.

In the solution according to the invention, a coupling point can be formed between the loading device and the at least one rod of the tool in the region of the clamping jaw. As a result, the dimensions of the tool can be kept small. This is advantageous, in particular, for a fluid passage, such as a cooling medium passage. This in turn allows, for example, a fluid tube with a small overall size to be used for the fluid connection between the spindle and tool.

It is provided, in particular, that the loading device has at least one linearly movable rod, to which the at least one rod of the tool can be coupled. This allows a pushing loading and pulling loading of the at least one rod of the loading device to be directly achieved on the at least one rod of the tool.

In particular, the spindle comprises a drive device for the loading device. This allows the at least one rod of the tool (control spindle) to be positioned and displaced in a defined manner, the positioning and displacement being achievable both during a forward travel movement and a return travel movement. The drive device may be differently configured. For example, it is formed by a motor device. The motor device may comprise one or more electric motors here. A fluid actuation of the loading device is basically also possible.

It is advantageous if the tool comprises at least one tool element, which is adjustable by the at least one rod of the tool. The tool acts on a workpiece by means of the tool element. The tool element is, for example, a cutting edge or a cutting edge device.

The at least one tool element is advantageously a cutting edge or a cutting edge device or comprises one such device. For example, the corresponding tool is a fine drilling tool with cutting edges. The tool may, for example, also be a honing tool with a cutting edge device, which is multi-edged and, in particular, comprises honing stones.

It is favorable, in particular, if the tool comprises at least one cutting edge or cutting edge device, which can be coupled to the at least one rod of the tool, the cutting edge or cutting edge device being adjustable transversely to a rotational axis of the tool by means of the at least one rod of the tool. The transverse position of the cutting edge or cutting edge device can be adjusted precisely relative to the rotational axis of the tool by coupling by means of the pull/push coupling device, both with respect to the forward travel movement and the return travel movement.

It is quite particularly advantageous if the pull/push coupling device defines a fixing position, in which the loading device is braced with the at least one rod of the tool with regard to pulling and pushing. In the fixing position, by means of the action of the loading device on the at least one rod of the tool, said rod can be displaced. During an exertion of pressure, a forward travel movement takes place. When the loading device is pulled back, a pulling movement of the at least one rod takes place. These travel movements are initiated here solely by means of the loading device.

In a structurally favorable embodiment, one end face of the loading device abuts the at least one rod of the tool in the fixing position. As a result, a forward travel movement of the at least one rod of the tool can easily be realized by exerting pressure by means of the loading device.

It is furthermore favorable if, in the fixing position, the at least one rod of the tool and the loading device are positively connected. As a result, a return travel movement of the at least one rod of the tool can easily be achieved during a return travel movement of the loading device.

In one embodiment, the loading device has a recess and the at least one rod has a penetration region into the recess. As a result, a fixing of the at least one rod of the tool on the loading device can easily be achieved. A coupling for a fluid guide, for example for cooling medium and/or lubricating medium, can also easily be achieved between the spindle and tool.

It is advantageous if a set-back region is arranged on an outside of the wall of the recess. A positive connection between the loading device and the at least one rod of the tool can easily be achieved by means of the set-back region of the loading device. The wall of the recess is used to form this set-back region (recessed region).

In the solution according to the invention, a tool can easily be supplied, for example centrally, with fluid (cooling medium, lubricating medium, cooling lubricating medium) by means of the spindle. In one embodiment, the tool and/or the spindle has a rigid tube for fluid coupling.

In an advantageous embodiment, the tool and/or the spindle has a movably mounted tube for fluid coupling between the spindle and tool. The coupling can be facilitated by means of a movably mounted tube and, for example, a tube mounted in a reciprocating manner. Sealing wear due to friction of the tube during the coupling process can be minimized.

The clamping jaw is advantageously connected to at least one rod of the tool and displaceable therewith. As a result, a pull/push coupling is realized between the at least one rod of the tool and the loading device at a working travel region of the loading device of the spindle.

It is structurally favorable if the clamping jaw has at least one pivotable gripping arm. A fixing position and a release position of the pull/push coupling device can easily be achieved by the pivotable gripping arm.

In particular, the at least one gripping arm is pivotable about a pivot axis, which is oriented transversely to a movement direction of the at least one rod of the tool. If a blocking face blocks the pivotability of the gripping arm, a positive connection can easily be achieved between the gripping arm and the loading device. A fixing position can easily be released or a fixing position can be achieved starting from a release position by providing an entry region, which no longer blocks the pivotability.

It is favorable if the at least one gripping arm is spring-loaded, a spring force tending to pivot the at least one gripping arm away from an axis of the at least one rod of the tool. If a corresponding blocking face is provided, the gripping arm cannot pivot so far that, for example, a positive connection between the at least one rod of the tool and the loading device is released. If the blocking face is no longer present, the positive connection can then be released in a simple and, in particular, automatic manner.

It is favorable if the clamping jaw has a first abutment region, which cooperates with a second abutment region of the loading device, the first abutment region abutting the second abutment region and a positive engagement being produced when the at least one rod of the tool is coupled to the loading device. As a result, a pull/push connection can easily be produced between the at least one rod of the tool and the loading device of the spindle.

In a structurally simple embodiment, the first abutment region is formed by a widening at one end region of a gripping arm. A positive connection between the loading device and the at least one rod of the tool can easily be produced by a widened end region of this type.

The second abutment region is formed, in particular, by a set-back region on the loading device. When the first abutment region of the gripping arm enters a recess, which is delimited by the second abutment region and this entry position is secured, a positive connection is produced. A tool can be released when the first abutment region has been removed.

In one embodiment, the tool has a support device, on which the clamping jaw is supported in a fixing position of the pull/push coupling device. An inside of the support device prevents the clamping jaw from pivoting out and thereby, in particular, secures a positive connection of the at least one rod of the tool to the loading device. A coupling can be produced or released by engagement on the support device (for example by moving the support device as a whole or by providing a movement or movability of a part of the support device). The support device can in turn easily be acted on by means of the spindle and, in particular, an end face of the spindle.

In particular, in the fixing position, the first abutment region abuts the second abutment region and the support device provides a blocking face for the clamping jaw.

It is advantageous if the support device has or delimits an entry region for a counter-region of the clamping jaw, the counter-region being located outside the entry region in a fixing position of the pull/push coupling device and penetrates the entry region in the release position of the pull/push coupling device. When the counter-region has entered the entry region, the clamping jaw no longer presses on the loading device and the tool can be released from the spindle. When the counter-region is located outside the entry region, and in particular abuts an inside of the support device outside the entry region, a pivotability of the clamping jaw can be blocked and a positive connection can thereby be produced. By a movement of the support device or on the support device, the entry region can be brought over the counter-region in order specifically to achieve an entry and therefore a release of a positive connection. Conversely, by a corresponding positioning of the support device or on the support device, the counter-region can be removed from the entry region in order to produce a positive connection to the loading device. By, for example, displacing the support device, a fixing or release of a tool can thereby be obtained with regard to the loading device.

If, for example, the support device is spring-loaded, a fixing position can automatically be achieved by corresponding positioning of the loading device. By a corresponding exertion of force counter to the spring force on the support device, a tool can be released.

In particular, a first abutment region of the clamping jaw does not abut a second abutment region of the loading device when the counter-region penetrates the entry region. Advantageously, a positive connection is achieved between the at least one rod of the tool and the loading device when the first abutment region of the clamping jaw abuts the second abutment region of the loading device. This positive connection is released by the entry of the counter-region into the entry region.

It is quite particularly advantageous if the entry region or a delimiting device of the entry region is movable. As a result, the entry region can be positioned in a controlled manner. A removal can be allowed or facilitated in order to fix a tool. Furthermore, an entry can be allowed or facilitated to release a tool.

It is provided, in particular, that the support device is movable and/or has one or more movable elements. As a result, the movement in and out of the clamping jaw can easily be carried out to release a positive connection or produce a positive connection. The support device is arranged in the region of the clamping jaw and in particular surrounds it. The tool can thus be formed with small dimensions and the movability of the support device, as a whole or as a part thereof, easily allows the release or fixing.

In one embodiment, the support device comprises a sleeve, which is movably and, in particular linearly movably, arranged on the tool. A fixing, and in particular positive fixing, of the at least one rod of the tool on the loading device can thus easily be achieved and this positive fixing can easily be released.

It is advantageous if the sleeve is spring-loaded, a spring force tending to push the sleeve, in the fixing position of the pull/push coupling device, in the direction of the loading device. It is thereby possible for the sleeve, in a working travel region of the loading device, to form a blocking face for a pivoting out of the clamping jaw. Due to the spring force, the position of the sleeve ensures a positive connection between the clamping jaw and the loading device.

In an advantageous embodiment, a blocking device is provided to block a displaceability of the sleeve away from the loading device. A transition can thereby easily be achieved between a release position and fixing position and vice versa.

In particular, a release position of the pull/push coupling device is defined by an abutment of the sleeve on the blocking device. If the loading device is then in a corresponding position, in particular an entry region of the sleeve and a counter-region of the clamping jaw are located over each other, so an entry is made possible and a positive connection between the at least one rod of the tool and the loading device is cancelled.

It is advantageous if the sleeve has an end face, on which the spindle can act to displace the sleeve by means of the spindle and, in particular, by means of an end face of the spindle. For example, a displacement of this type can be achieved when the tool is held, for example, by a tool releasing device and the tool spindle acts with its end face on the sleeve and displaces it such that, in particular, an entry of the counter-region of the clamping jaw into an entry region is made possible to release a positive connection between the at least one rod of the tool and the loading device. The sleeve can be freed and a fixing position secured by a corresponding translatory return travel movement of the spindle as a whole.

In a further embodiment, the support device comprises a tongue device with at least one tongue, which is movable transverse to a displacement device of the rod. In particular, the at least one tongue is configured and/or arranged to be resilient and correspondingly resiliently and flexibly movable. The tongue can then be positioned in such a way that an entry into the entry region or a removal is easily made possible. This can in turn be controlled, in particular, by means of the spindle (by means of the positioning thereof). As a result, a fixing and release are easily made possible. In particular, the production or cancelling of a positive connection between the clamping jaw and the loading device of the spindle can be carried out easily.

Advantageously, the tongue device delimits an entry region for the clamping jaw. As a result, the at least one tongue can easily be accessed and, in particular, the tongue can be acted on by means of the spindle and advantageously by way of an end face of the spindle.

It is particularly advantageous if arranged on the tool is a blocking device, on which the spindle can act, in particular by means of an end face in order to free and/or block the transverse movability of the at least one tongue. A blocking of the transverse movability is, in particular, provided when the tool is fixed on the spindle. To produce the fixing position or to release the fixing position, it is advantageous if a movability of the at least one tongue is allowed. In a simple manner, this allows a release of the positive connection, as the movability of the tongue allows a corresponding movability of the clamping jaw.

In one embodiment, the blocking device comprises at least one blocking element, which is displaceable between the tongue device and a wall of the tool. The position of the at least one blocking element determines whether transverse movability of the at least one tongue is allowed or not. The transverse movability of the at least one tongue can thus be controlled by means of the positioning of the at least one blocking element. The at least one blocking element can easily be displaced by means of the spindle and, in particular, by means of an end face of the spindle by corresponding engagement. A resetting movability is provided by means of a spring loading, for example.

It is quite particularly advantageous if the tool has an operating device for the spindle and, in particular an end face of the spindle, by means of which, depending on the position of the spindle, it is possible to free and/or block the ability of the counter-region of the clamping jaw to enter the entry region. The tool can thereby be acted on by means of the spindle, as a whole, in order to release or fix it. The spindle can thus be formed in a simplified manner as, for example, no control tube has to be provided on the spindle.

In particular, a movement or movability of the support device or a part of the support device can be brought about by the operating device. For example, caused by the operating device, the support device as a whole can be displaced by the spindle in order to release a positive connection of the clamping jaw to the loading device of the tool. In another embodiment, a part of the support device is made movable by means of the operating device, controlled by the spindle, for example by a corresponding resilient configuration and release of a counter-support, which allows or facilitates an unthreading of the clamping jaw from a positive connection.

Advantageously, a standard interface is provided on the spindle for coupling the tool outside the coupling of the at least one rod of the tool to the loading device. This standard interface is, in particular, a hollow-taper-shank interface.

The following description of preferred embodiments is used, in conjunction with the drawings, for a closer description of the invention.

DETAILED DESCRIPTION OF THE INVENTION

Figure 1:
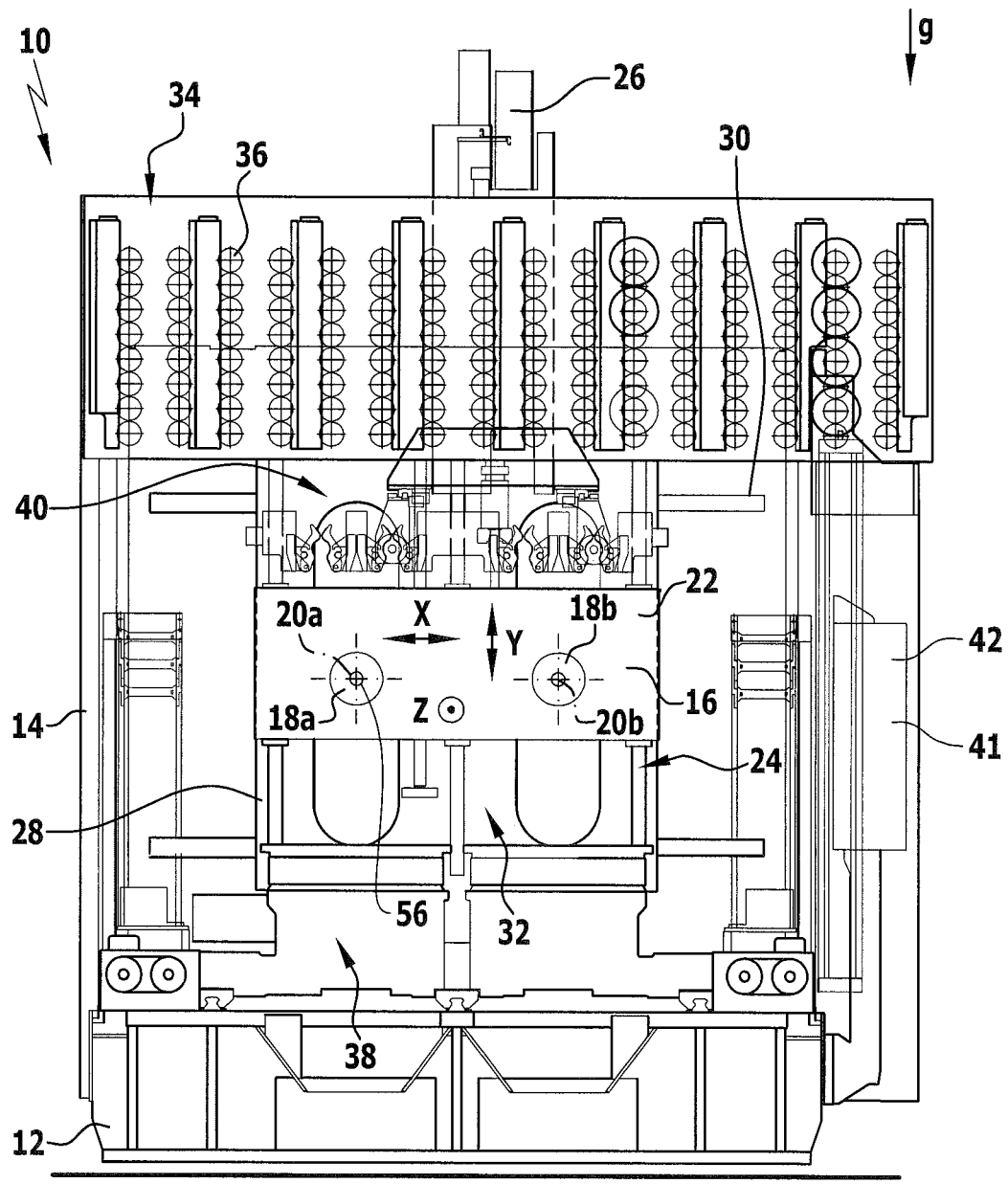
FIG. 1 shows a schematic partial view of an embodiment of a machine tool.

An embodiment of a machine tool, on which a spindle/tool combination according to the invention can be deployed, is a machining center. An embodiment of a machining center, which is shown schematically in a partial view in FIGS. 1 and 2 and designated 10 there, comprises a machine bed 12, on which a machine frame 14 is arranged. The machine frame 14 is in the form of a gantry and, in a vertical direction in relation to the gravitational force direction g, projects beyond the machine bed 12. A tool carrier device 16, which comprises at least one spindle 18, is held on the machine frame 14.

Figure 2:
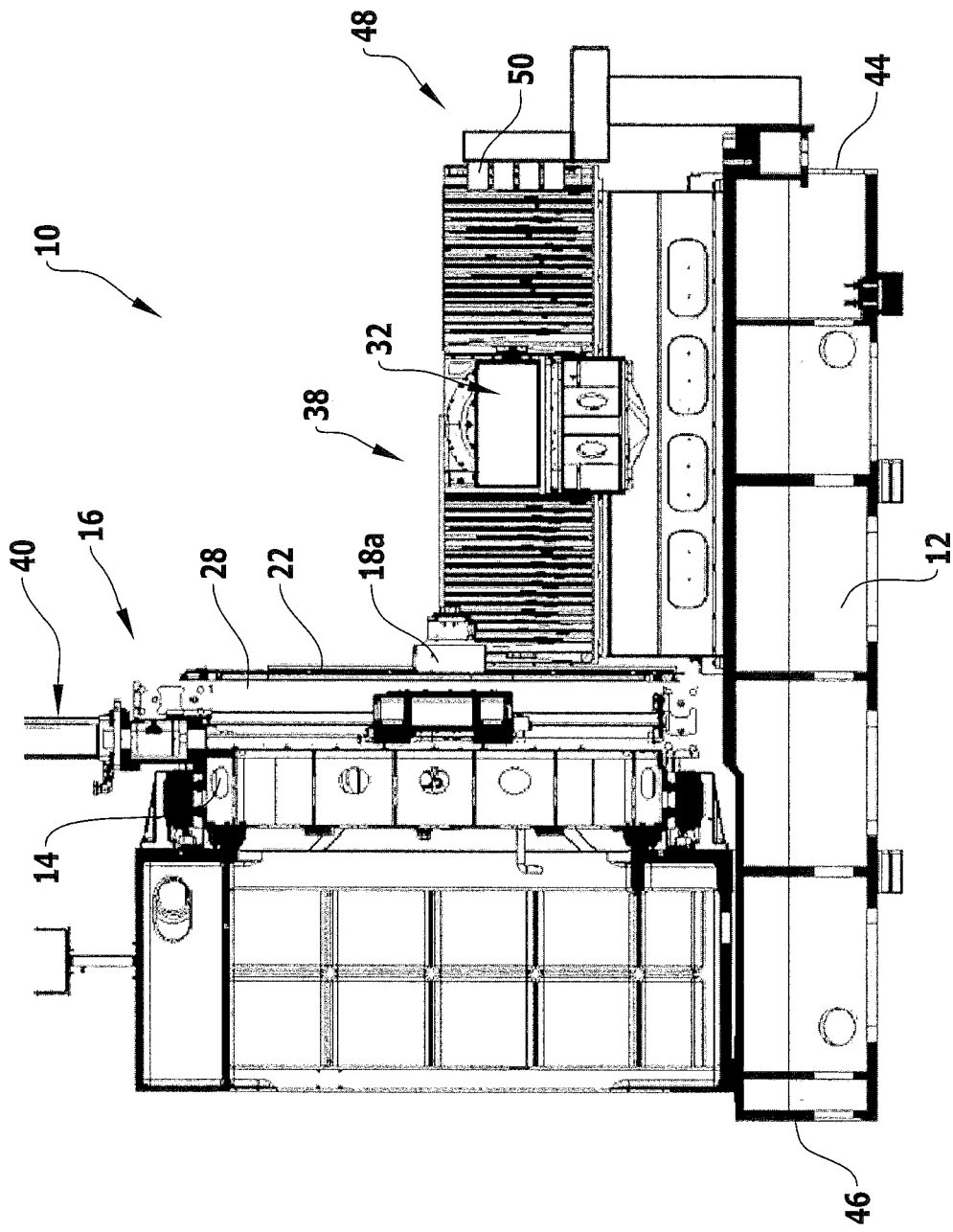
FIG. 2 shows a side view of the machine tool according to FIG. 1 without a covering.

In the embodiment shown, the tool carrier device 16 comprises a first spindle 18a and a second spindle 18b. A tool held on the respective spindles 18a, 18b can be rotated about a rotational axis 20a, 20b. In the view according to FIG. 1, the rotational axes 20a, 20b are located parallel to one another. They are oriented parallel to a Z-direction, which, in the view according to FIG. 1, is perpendicular to the plane of the drawing. The Z-direction is, in particular, a horizontal direction in relation to the gravitational force direction g.

The tool carrier device 16 is configured as a slide 22, which is held on a slide guide 24 and is linearly movable in a Y-direction (direction and counter-direction) by means of the slide guide 24. The Y-direction is transverse and, in particular, perpendicular to the Z-direction. In relation to the gravitational force direction g, the Y-direction is, in particular, a vertical direction.

To drive the movement of the slide 22 in the Y-direction and to position it, a drive device 26 is associated with the slide 22. Said drive device may, for example, comprise a ball screw or a linear motor.

The slide 22 is itself held on a slide 28, which is linearly displaceable in an X-direction (direction and counter-direction) on a slide guide 30. A corresponding drive is provided for displacement and positioning. The X-direction is transverse and, in particular, perpendicular to the Y-direction and the Z-direction. The X-direction in relation to the gravitational force direction g is, in particular, a horizontal direction.

There is arranged on the machine bed 12 (at least) one workpiece carrier 32. The first spindle 18a and the second spindle 18b and thus tools held thereon and the workpiece carrier 32 are movable relative to one another in the Z-direction (direction and counter-direction). A workpiece held on the workpiece carrier 32 and the spindle 18a or 18b are therefore displaceable relative to one another in the X-direction as the first direction, the Y-direction as the second direction, and the Z-direction as the third direction.

In one embodiment, the spindles 18a, 18b are not movable in the Z-direction to machine a workpiece and the workpiece carrier 32 is displaceably held on the machine bed in the Z-direction. A drive is associated with the workpiece carrier 32 for this purpose.

In an alternative embodiment, the first spindle 18a and the second spindle 18b are displaceably held on the tool carrier device 16 in order to allow a Z-displaceability.

It is also possible to combine a Z-displaceability of the spindles 18a, 18b on the tool carrier device 16 and a Z-displaceability of the workpiece carrier 32 on the machine bed.

It may, for example, also be provided that the workpiece carrier 32 can be rotated about a, for example, vertical axis.

The machining center 10, in the embodiment shown, has a bearing device 34 for tools 36, which is arranged above a working space 38, in which workpieces are machined.

Furthermore, a tool changing device 40 is provided, by means of which tools 36 can be deployed on the spindles 18a and 18b and removed therefrom.

A corresponding machining center is described, for example, in WO 2009/033920 A1. Reference is made to this document and this document is made part of the disclosure.

The machining center 10 may also comprise only a single spindle or comprise more than two spindles.

The machining center 10 has a control device 41, which is at least partially arranged in a switch box 42. Sequences of the workpiece machining can be controlled by means of the control device 41.

The machining center 10 has a front side 44 and a rear side 46. The working space 38 is directed to the front side 44.

In one embodiment, one or more auxiliary devices 48 are arranged on the front side 44. By means of an auxiliary device 48, a workpiece can be acted on, in addition to tools on spindles 18.

In one embodiment, a cleaning device 50 is provided as an auxiliary device 48. A workpiece is movable by means of the workpiece carrier 32 to the cleaning device 50. The workpiece can, for example, be cleaned there after a first machining process before a second machining process. This allows the machining quality to be improved. The cleaning takes place, for example, by a blowing process or by the direct action of a cleaning device.

The auxiliary device 48 may, for example, also be formed by a fluid jet device or comprise one such device. The fluid jet can be applied to the workpiece by the fluid jet device. The fluid jet may be a gas jet and/or a liquid jet. A fluid jet honing process can thereby be carried out, for example, with a corresponding configuration.

For example, it may alternatively or in addition be provided that the auxiliary device 48 is formed by a laser device or comprises such a device. It is thereby possible, for example, to carry out a laser structuring machining of a workpiece.

The auxiliary device 48 or the auxiliary devices 48 are arranged on an edge of the working space 38, for example on the front side 44, so an auxiliary device 48 does not hinder the relative movability between the workpiece carrier 32 and the spindles 18a, 18b.

Figure 3:
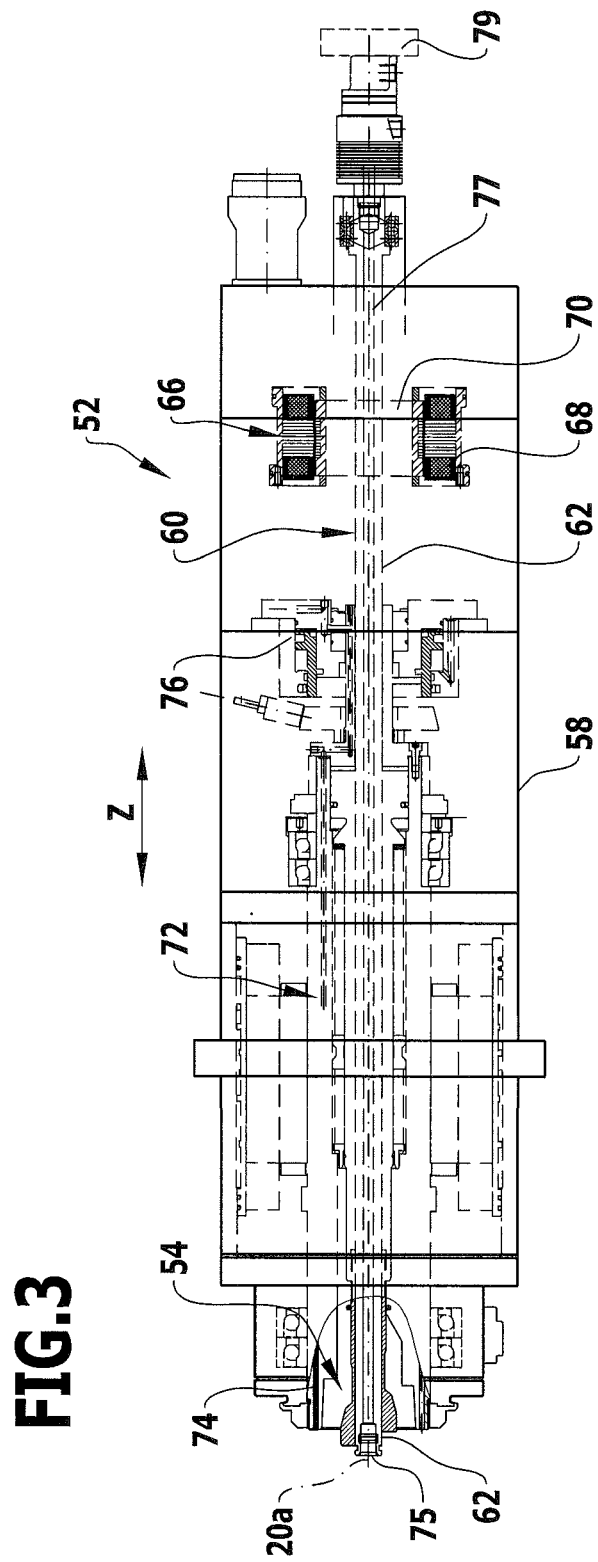
FIG. 3 shows a schematic view of an embodiment of a tool spindle.

An embodiment of a spindle, which is schematically shown in FIG. 3 and designated 52 there, comprises an interface 54 on a tool. The interface 54 is, for example, configured as a hollow-taper-shank (HSK) interface. A tool (indicated by the reference numeral 56 in FIG. 4) can be inserted in the spindle 52 and releasably fixed thereto at the interface 54. This fixing is secure against relative rotation, so that upon rotation of a corresponding rotatable part of the spindle 52, for example about the rotational axis 18a, the tool 56 is also rotated.

The spindle 52 comprises a housing 58. A loading device 60 is linearly displaceably mounted in the housing 58. The loading device 60 comprises, in particular, a linearly displaceable rod 62. A tool 56, as is described in more detail below, has a rod 64. When the tool 56 is fixed to the spindle 52 at the interface 54, the rods 62 and 64 are also coupled to one another. The rod 64 of the tool 56 can then also be moved by means of a controlled movement of the rod 62 of the spindle 52.

The spindle 52 comprises a drive device 66, which is arranged in the housing 58 of the spindle 52. The drive device 66 is integrated in the spindle 52. The drive device 66, for example, comprises an electric motor 68. Basically, a fluid drive and, in particular, a pneumatic or hydraulic drive may also be provided.

The drive device 66 is, for example, coupled to the rod 62 by means of a ball screw, which is designated by the reference numeral 70 in FIG. 3. A rotational movement of the electric motor 68 can be converted into a linear movement of the rod 62 by means of the ball screw 70.

By corresponding activation of the drive device 66, a defined feed/return travel of the rod 62 of the spindle 52 and therefore also of the rod 64 of the tool 56 can be achieved. In particular, the position of the rod 62, and therefore also of the rod 64, can be predetermined in a defined manner and in particular in a manner defined with respect to time.

The movement of the rod 62 is controlled by a corresponding activation of the drive device 66 by a corresponding part of the control device 41. An electromechanical, driven movement of the rod 62, and therefore of the rod 64, is effected by means of the electric motor 68.

The spindle 52 comprises a drive device designated by 72 as a whole, by means of which the interface 54 on the tool 56 can be rotated or turned about the rotational axis 20a, for example.

The spindle 52 has a compressed air interface 74 for the tool 56. The spindle 52 comprises an air feed device 76. This air feed device 76 has an effective fluid connection to the compressed air interface 74. The corresponding tool 56 has a counter-interface to the compressed air interface 74. Compressed air from the spindle 52 can then be introduced into the tool 56. This compressed air can be used as blowing air or, as described below in more detail, as measuring air during a pressure measurement.

The spindle 52 furthermore has an interface 75 for cooling lubricant, with which the tool 56 can be supplied. For example, formed in the rod 62 is a channel 77 for cooling lubricant, which has a fluidic connection to the interface 75 and a supply device 79 for cooling lubricant of the machine tool.

In one embodiment, the machining at least partially takes place with water-mixable cooling lubricant (emulsion) or with oil such as honing oil.

Figure 4:
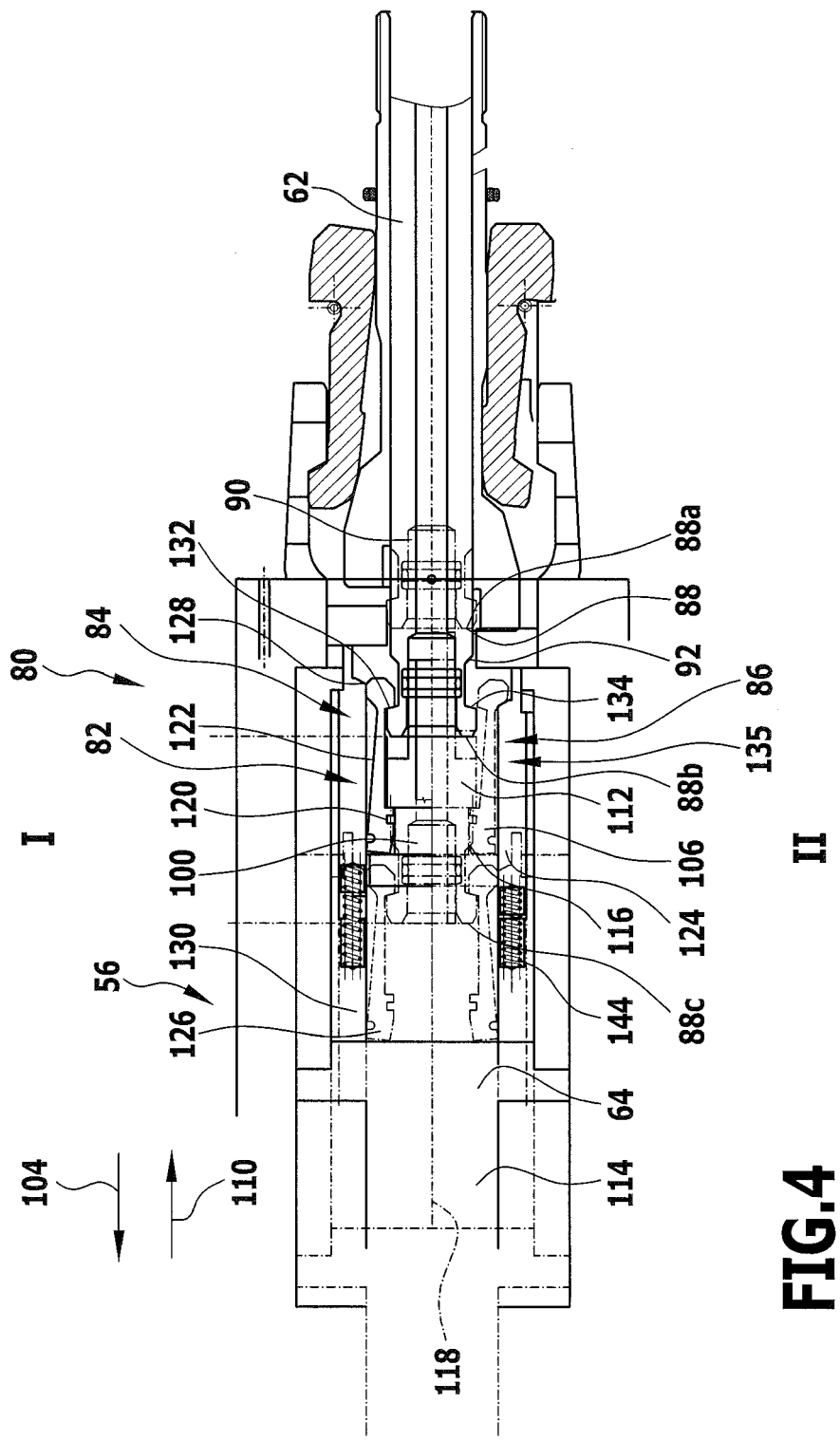
FIG. 4 shows a schematic view of an embodiment of a spindle/tool combination according to the invention in the region of a coupling interface, a fixing position being shown in the upper part (I) and a release position being shown in the lower part (II)
Figure 5:
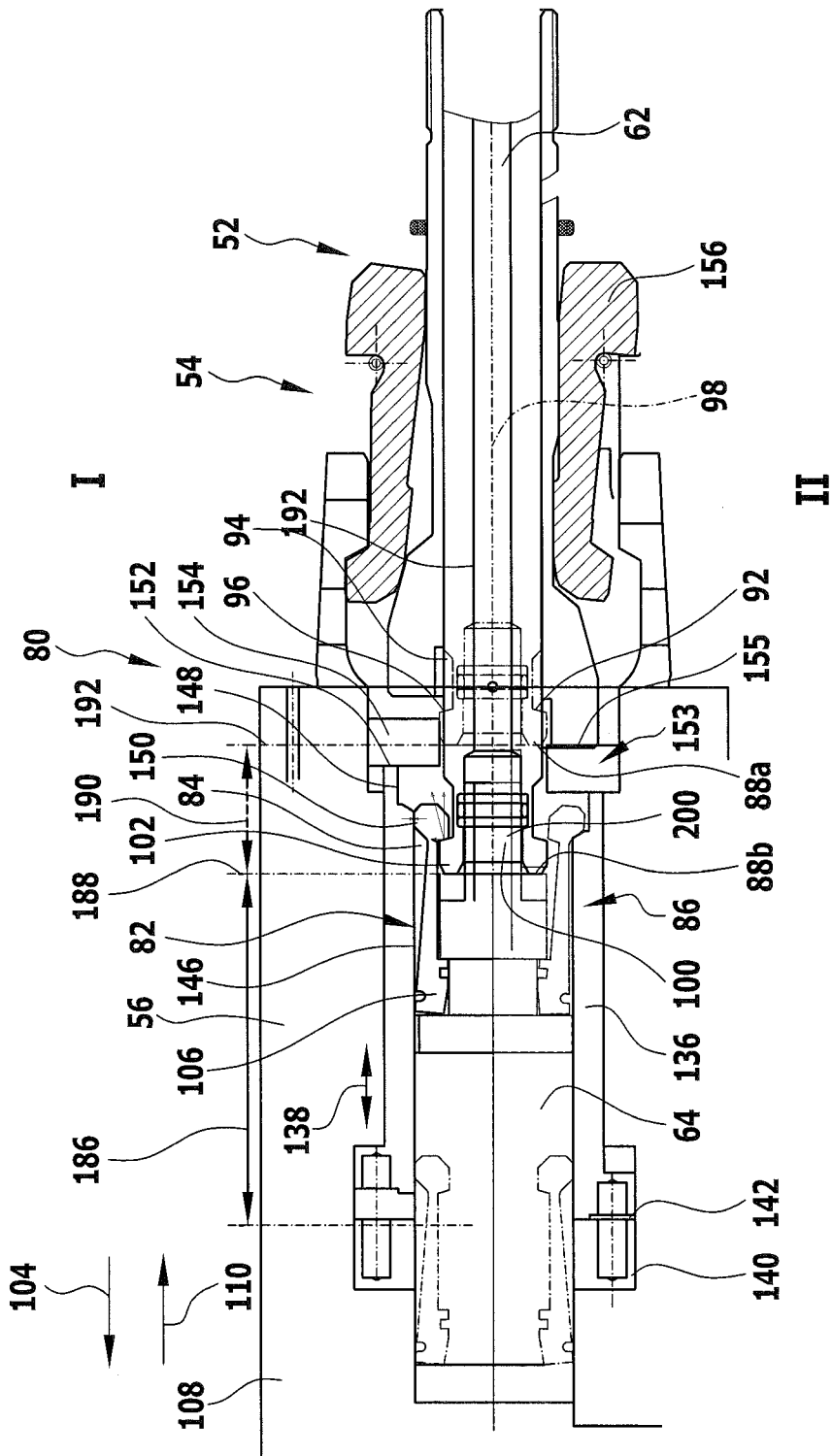
FIG. 5 shows a similar view of a spindle/tool combination to FIG. 4.

An embodiment of a spindle/tool combination according to the invention, which is shown schematically in a partial view in FIGS. 4 and 5 and designated 80 there, comprises a pull/push coupling device 82, by means of which the rod 62 of the loading device 60 of the spindle 52 and the rod 64 of the tool 56 are coupled to one another in such a way that the rod 64 of the tool 56 can carry out a push movement initiated by the rod 62 (in which the rod 62 to a certain extent pushes the rod 64) or a pull movement (in which the rod 62 pulls the rod 64).

FIGS. 4 and 5, in an upper half, show a position of the pull/push coupling device 82, which is a fixing position 84. The rod 62 and the rod 64 are coupled in this position for a possible pull movement and push movement.

A release position 86 of the pull/push coupling device 82 is shown in the lower half, in which a tool 56 can be deployed on the spindle 52.

The rod 62 of the spindle 52, in the region of a front end 88, has a recess 90. (FIG. 4 shows different positions 88a, 88b, 88c of the front end 88. The positions 88a, 88b of the front end 88 are shown in FIG. 5.)

The recess 90 is surrounded by a wall 92. The wall 92, on its outside, has a recess 94, which is a recessed region in relation to the outer surface of the wall. A set-back region 96, which is oriented transversely to an axis 98 of the rod 62, is provided by the recess 94. (The axis 98 lies coaxially with respect to the corresponding rotational axis 20*a*.)

The rod 64 of the tool 56 has an entry region 100, which is provided for entry into the recess 90 of the rod 62. When the rod 64 is coupled to the rod 62, the entry region 100 is positioned in the recess 90.

The entry region 100 projects beyond an end face 102 of the rod 64. The end face 102 is, for example, annular. When the rod 62 and the rod 64 are coupled to one another, the front end 88 abuts the end face 102. The rod 62 can then exert a pressure on the rod 64 and displace the latter in a feed direction 104 to the front (away from the spindle 52).

The pull/push coupling device 82 has a clamping jaw 106. This clamping jaw 106 is arranged in the tool 56 within a housing 108 of the tool 56.

The clamping jaw 106 is pivotably positioned here on the rod 64 and linearly displaceable therewith in the feed direction 104 and the return travel direction 110.

The rod 64 has an end region 112, on which the end face 102 is formed and on which the entry region 100 is seated. This end region 112 has a smaller diameter than a main region 114 of the rod 64. Arranged between the end region 112 and the main region 114 is an intermediate region 116. The end region 112, the main region 114 and the intermediate region 116 are, in particular, coaxial to an axis 118 of the rod 64. (The axis 118 and the axis 98 are coaxial to one another in the fixing position 84 of the pull/push coupling device.)

The intermediate region has a smaller diameter than the main region 114 and the end region 112. The intermediate region 116 is set back relative to an end region 112. A receiving space 120 is formed thereby. At this receiving space, the clamping jaw 106 is positioned on the rod 64.

The clamping jaw 106 comprises gripping arms 122 here, for example two gripping arms, which are in each case positioned on the rod 64 so as to be pivotable about a pivot axis 124, the pivot axis 124 being located transversely, and in particular perpendicularly, to the axis 118. The respective pivot axis 124 is perpendicular to the plane of the drawing in FIGS. 4 and 5.

A fixing region 126 of a respective gripping arm 122 is located in the receiving space 120. The gripping arm 122 then extends past an outside of the end region 112 and itself has an end region 128. A gripping arm 122 is spring-loaded here by a spring device 130, a spring force tending to pivot a corresponding gripping arm 122 outwardly, in other words away from the axis 118.

The end region of a gripping arm 122 has a first abutment region 132 facing the recess 94. A second abutment region 134 is formed on the set-back region 96 of the recess 94. The first abutment region 132 at the end region 128 thus projects on the gripping arm 122 beyond a region outside the end region 128 in the direction of the recess 94. When the first abutment region 132 of the rod 64 abuts the second abutment region 134 of the rod 62, and the pivotability of the corresponding gripping arm 122 away from the rod 62 is blocked (see below), a positive engagement between the end region 128 and the rod 62 is achieved. A pull coupling between the rod 62 and the rod 64 is thereby realized.

The gripping arms 122 of the clamping jaw 106 are dimensioned in such a way that when the front end 88 of the rod 62 abuts the end face 102, the first abutment region 132 can abut the second abutment region 134.

A support device 135, for example in the form of a sleeve 136, is arranged on the tool 56, surrounding the rod 64. The sleeve 136 is linearly displaceable in a direction/counter-direction 138, which is parallel to the axis 118 or the feed direction 104/return travel direction 110.

A blocking device 140, which blocks the movability of the sleeve 136 away from the spindle 82, is fixedly arranged with respect to the housing 108 of the tool 56. The blocking device 140 provides an abutment face 142, which is annular, for example.

A spring device 144 is supported on the blocking device 140 (FIG. 4), which spring device comprises one or more springs and which act on the sleeve 136. The spring force of the spring device 144 attempts, if no counter force acts, to push the sleeve 136 in the direction of the spindle 82.

The rod 64 of the tool 56 slides in the sleeve 136. The sleeve 136 has an inside 146, which surrounds the intermediate region and the end region 112 of the rod 64. In the fixing position 84 of the pull/push coupling device 82, the end region 128 of the gripping arms 122 is supported on this inside 146. In this connection, the end region 128 is dimensioned such that the first abutment region 132 abuts the second abutment region 134 and no removal can take place because of the abutment of the end region 128 on the inside 146.

The inside 146 is, in particular, cylindrical in this case.

When the rod 64 is moved by means of the rod 62 by pulling or pushing, the end region 128 of the clamping jaw 106 slides on the inside of the sleeve 136. Accordingly, the drive device 66 has to overcome the frictional force for the friction between the end region 128 and the inside 146 of the sleeve 136. By a corresponding selection of the force engagement points of a gripping arm 122 on the abutment region 132 or 134 and the abutment of an end face in the receiving space 120, this frictional force can be kept small.

An entry region 148, which is a set-back region and is, for example, annular, is formed on the inside 146 of the sleeve 136. The end region 128 of the clamping jaw 106 has, for example in the form of a thickening, a counter-region 150, which can enter the entry region 148. If the counter-region 150 has entered the entry region 148, the first abutment region 132 is removed from the recess 94 and the first abutment region 132 does not abut the second abutment region 134. The release position 86 has then been reached and the pull/push coupling device 82 releases the rod 64, so the tool 56 can be removed.

The sleeve 136 has an end face 152 facing the spindle 52. The entry region 148 is formed on the end face 152. An abutment face is seated on the end face 152. An abutment element 154 is arranged for this purpose on the end face 152. The abutment element 154 is displaceable with the sleeve 136. The spring device 144, in the fixing position 84, pushes the sleeve 136 with the abutment element 154 on the end face 152 toward the spindle 52, without the abutment element 154 touching the latter. The entry region 148 then abuts the abutment element 154 and the counter-region 150 has been removed from the entry region 148 and the first abutment region 132 can abut the second abutment region 134.

When, by a corresponding exertion of force on the abutment element 154 by an end face 155 of the spindle 52 (bottom of FIG. 5), a force is exerted, which overcomes the force of the spring device 144 (see bottom of FIG. 5), the sleeve 136 is then displaced to the blocking device 140 until it abuts there. As a result, the entry region 148 is displaced in the feed direction 104 and the counter-region 150 can enter the entry region 148. This allows a decoupling of the rod 64 from the rod 62, in other words, the release position 86 is reached. The pivoting out of the gripping arms 122 for the counter-region 150 to enter the entry region 148 is thus brought about by the spring device 130.

The tool 56 can be fixed outside the rod 64 on the spindle 52 by means of a conventional interface such as a hollow-tapershank interface. A pivotable clamping jaw 156, which ensures a non-rotatable coupling of the tool 56 on the spindle 52, is, for example, provided for this.

One or more tool elements, which, in particular, comprise a cutting edge or are a cutting edge or comprise a cutting edge device or are a cutting edge device, can be defined by the rod 64 of the tool 56.

Figure 6:
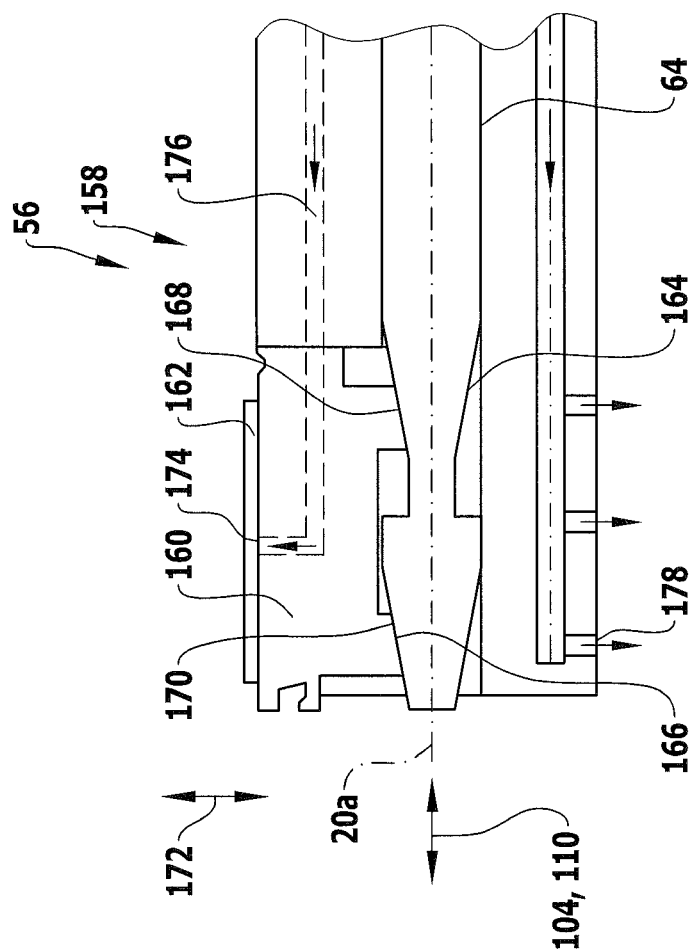
FIG. 6 shows a schematic (partial) view of an embodiment of a honing tool.

An example of a corresponding tool 56 is a honing tool 158 (FIG. 6). This has (at least) one honing stone retainer 160, on which a cutting edge device 162 is seated. The device 162, by means of which the honing tool 158 acts on a workpiece, forms a corresponding honing element, and is multi-edged. In particular, the cutting edge device 162 comprises bound grain. During a honing machining, because of the cutting edge device 162, a constant surface contact is present between the honing tool 158 and the workpiece. During the honing machining, an oscillating change of direction of the longitudinal movement takes place between the rotating honing tool 158 and the workpiece. This longitudinal movement is achieved here by the relative movement between the workpiece carrier 32 and the spindle 52. The workpiece surfaces achieved during the honing process have parallel, crossing flutes.

The honing stone retainer 160 is coupled to the rod 64. For example, the rod 64, for this purpose, has a first wedge-shaped region 164 and a second wedge-shaped region 166. The honing stone retainer 160 is supported on the first wedge-shaped region 164 by a first region 168 with a wedge-shaped counter-bearing surface and on the second wedge-shaped region 166 by a second region 170 with a wedge-shaped counter-bearing surface. A feed of the rod 64 in the feed direction 104 parallel to the rotational axis 18a brings about a displacement of the honing stone retainer 160 in a direction 172 transverse and, in particular perpendicular, to the direction 104. A corresponding position of the honing stone retainer 160 in relation to the direction 172 is determined by the position of the rod 64 in the direction 104/counter direction 110. This position is held by means of the drive device 66. This position is in turn adjustable.

The cutting edge device 162 can be adjusted relative to a workpiece by changing the position of the rod 64 (brought about by a change in position of the rod 62). A contact pressure of the honing tool 158 on a workpiece can thereby be adjusted, controlled in a defined manner.

Bores, for example, can be machined by honing by means of the honing tool 158.

The honing tool 158 has one or more openings 174 for compressed air, which have a fluidic connection to a compressed air interface. As a result, for example, compressed air can be blown into a bore. This opening or openings have a fluidic connection to the compressed air interface by means of one or more channels 176.

The diameter of a bore on the honing tool 158 can be measured, for example, by means of compressed air by a pneumatic ram pressure measurement. As a result, a remeasuring, for example after a fine drilling operation (see below) by a separate measuring device such as a measuring mandrel, is unnecessary. The honing tool provided in any case is then also the measuring tool to determine the diameter.

The honing tool 158 has one or more openings 178, which have a fluidic connection to a cooling lubricant interface of the honing tool 158. The cooling lubricant interface can be connected to the cooling lubricant interface 75 of the spindle 52. The honing tool 158 can thereby be supplied during a machining process with cooling lubricant.

Figure 7:
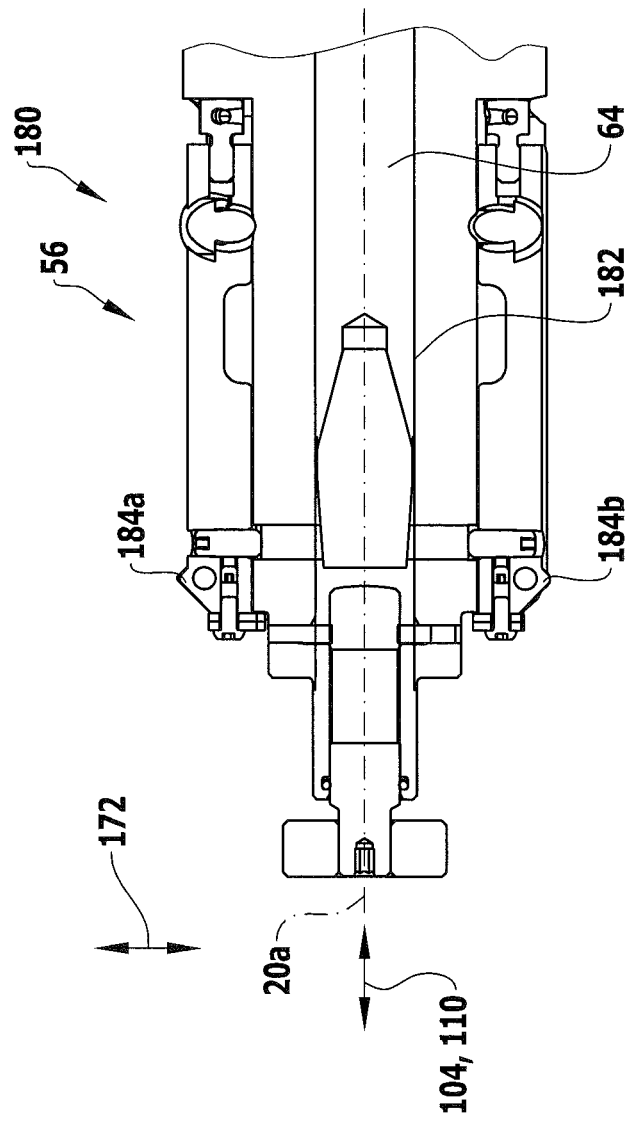
FIG. 7 shows a schematic (partial) view of an embodiment of a fine drilling tool.

One embodiment of a pre-machining tool is a fine drilling tool 180 (FIG. 7).

The fine drilling tool 180 comprises a rod 182 corresponding to the rod 64, which can be coupled to the rod 62 of the spindle 52.

The fine drilling tool 180 comprises cutting edges 184a, 184b. The cutting edges 184a, 184b are coupled to the rod 182. The cutting edges 184a, 184b can be adjusted in the direction 172 parallel to the direction 104/110 and, in particular, fed to a workpiece, by means of the feed/return travel of the rod 182 in the directions 104/110 parallel to a rotational axis 18a of the fine drilling tool 180. Cutting edge wear can be compensated, for example, by a feed of this type or a bore diameter can be determined.

Predetermined by the position of the rod 182, which is in turn adjusted, controlled by the position of the rod 62, the cutting edges 184a, 184b are located in a specific position in the direction 172, this position being adjustable, controlled in a defined manner, in the direction 172.

Basically, tools can be coupled which have a rod 64. As the pull/push coupling device 82 provided a coupling both by pulling and pushing, the position of the tool element(s) in the direction 172 can be adjusted in a defined manner by means of the corresponding machine tool 10. This makes it possible to make a tool compact, as, no resetting device has to be provided, for example, within the tool; the return travel in the return travel direction 110 takes place by means of the loading device 60 of the spindle 52.

Three-dimensional geometric structures can furthermore be machined by corresponding tools. For example, freeform faces can be produced.

Figure 8:
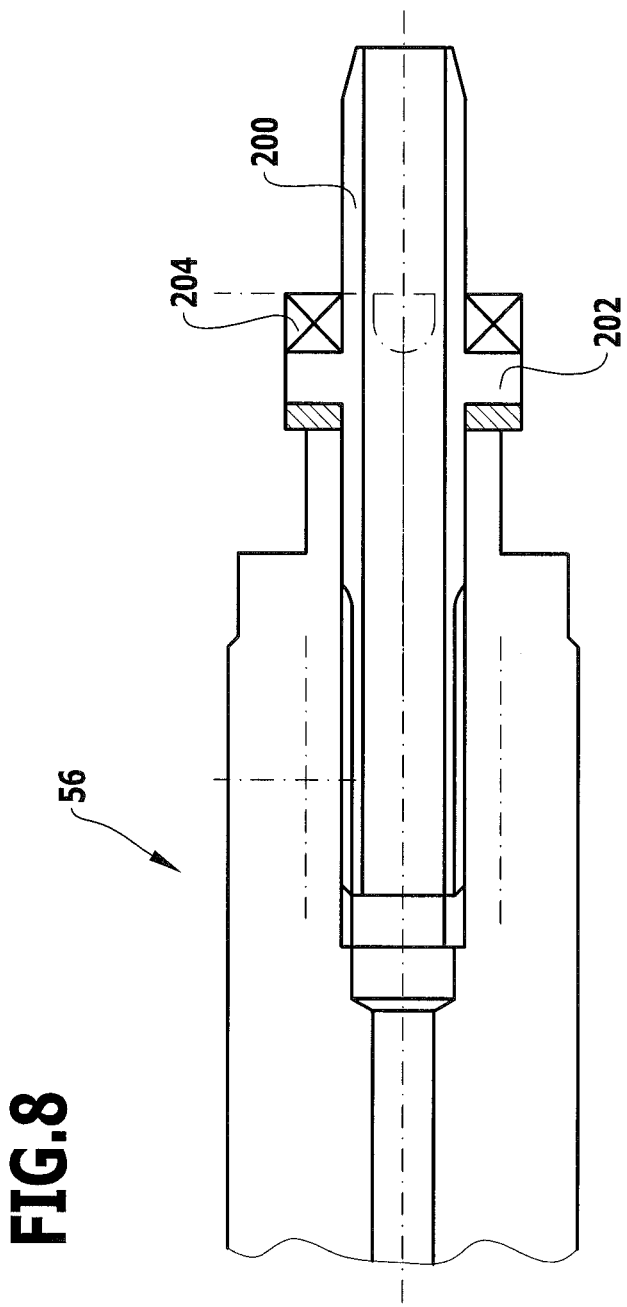
FIG. 8 shows a schematic partial view of a tool in the region of the coupling to the spindle.

The tool 56, for fluid coupling to the spindle 52, has a tube 200 (FIG. 8). This tube 200 can enter the entry region 100 of the spindle 52 and correspondingly, a fluid coupling can be realized.

A flange 202, on which a seal 204 is arranged for fluid sealing, is sealed on the tube 200.

In one embodiment (FIG. 8) the tube 200 is configured as a rigid tube, which is fixedly (non-movably) seated on the tool 56.

In a further embodiment (FIG. 9), a holding device 206 is fixed to the tool 56. This holding device 206 has a receiving space 208. The receiving space 208 is surrounded by a wall 210, on which a flange 212 with a seal 214 is seated. A tube 216 is movably mounted, and, in particular movably mounted in a reciprocating manner, in the receiving space 208. The tube 216 is, in this case, axially (parallel to the directions 104, 110) non-movably mounted or at most mounted with a small amount of play. A movement is allowed in transverse directions thereto.

Figure 9:
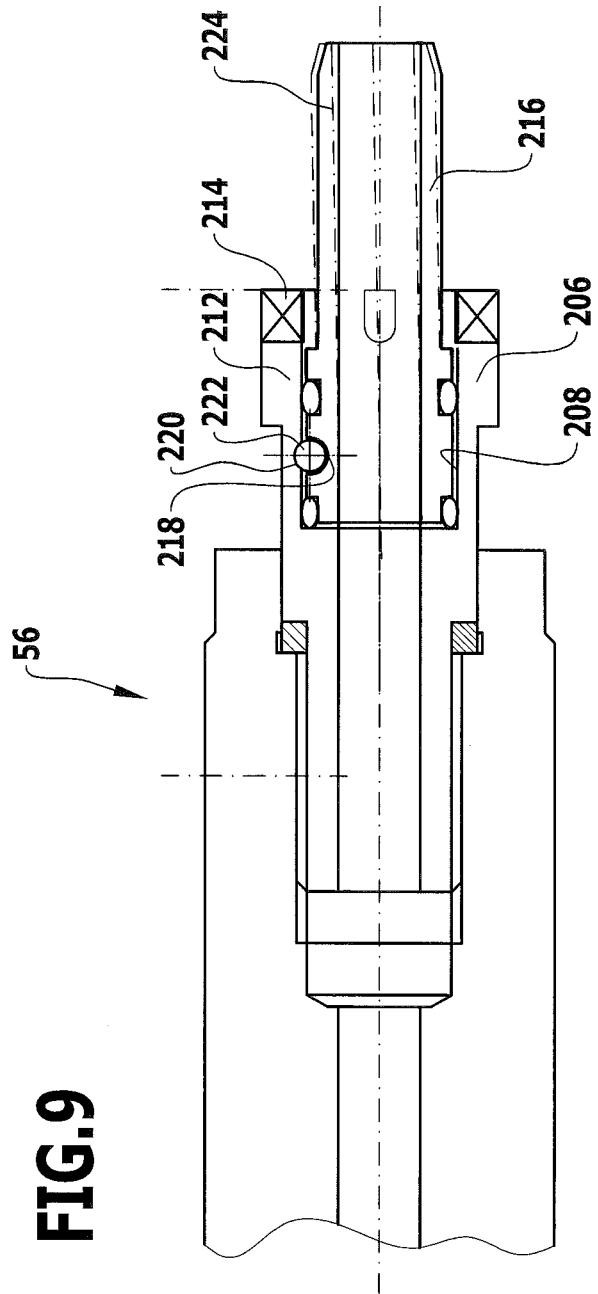
FIG. 9 shows a similar view to FIG. 8 in a different embodiment of a tool.

In one embodiment, one or more receiving regions 218 are arranged for this purpose in the tube 216. Corresponding receiving regions 220 are arranged opposite on the wall 210. Respective holding balls 222 are arranged in receiving regions 218 and 220. These holding balls 222 secure the tube 216 axially in the receiving space 208, but allow a reciprocating transverse movability. This transverse movability is indicated in FIG. 9 by the non-continuous lines with the reference numeral 224; the reference numeral 224 symbolizes the reciprocating ability of the tube 216.

The transverse movability of the tube 216 on the tool 56 allows easier production of the fluid coupling when the tool 56 is inserted on the spindle 52.

Figure 10:
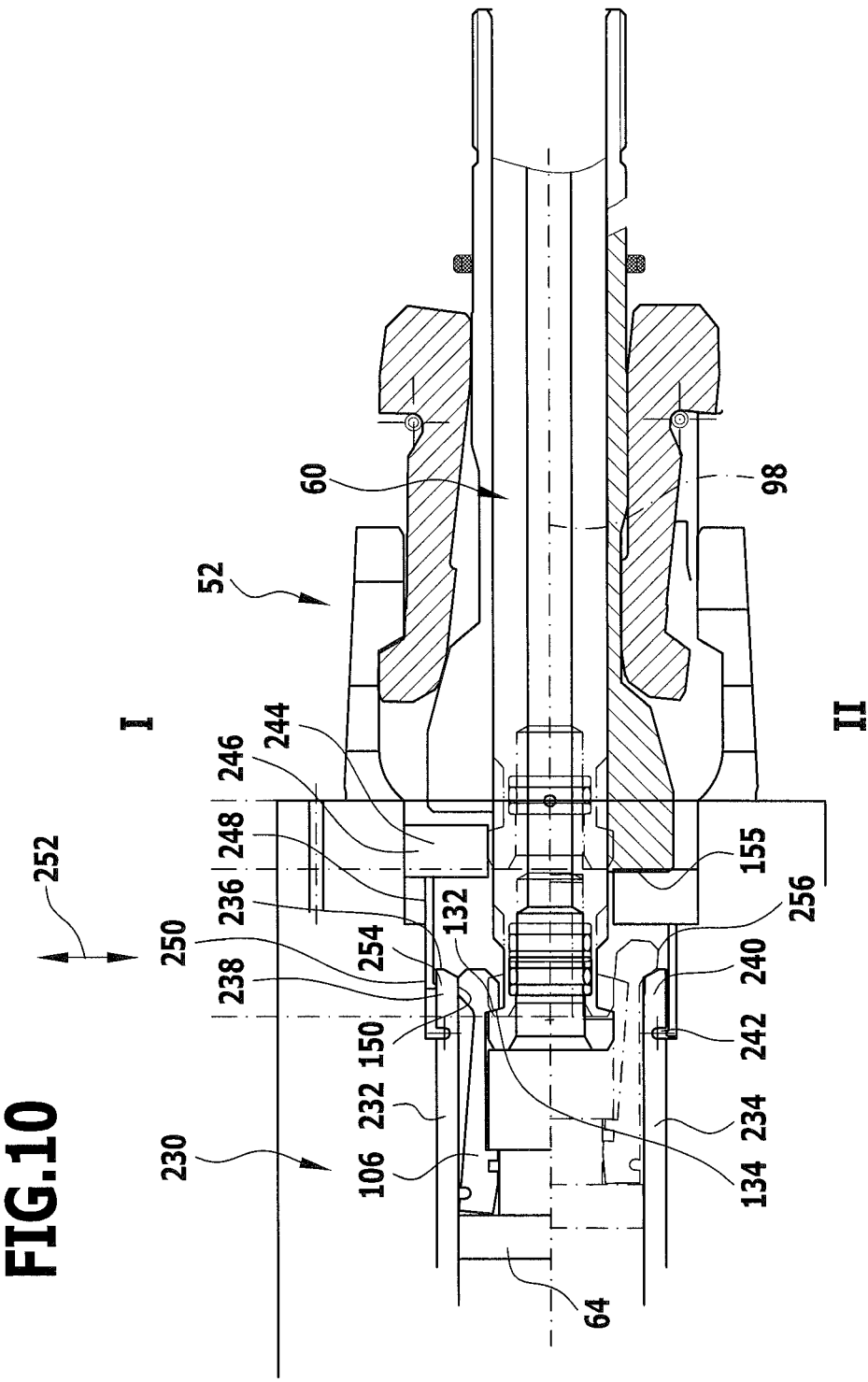
FIG. 10 shows a schematic view of a further embodiment of a spindle/tool combination in the region of a coupling interface, a fixing position being shown in the upper part (I) and a release position being shown in the lower part (II).

In a further embodiment of a tool, which is shown in FIG. 10 in a partial view and designated 230 there, a clamping jaw 106 is in turn provided. The same reference numerals are used here for the same elements as in the tool 56.

The spindle 52 is configured the same here as described above and the same reference numerals are used.

An abutment element 234, which is rigidly fixed in the tool 230 and surrounds the clamping jaw 106, is provided here as a support device 232 for the clamping jaw 106.

A tongue device 238 is arranged on the abutment element 234 in the region of an end face 236. The tongue device has one or more elastic tongues 240. For example, an incision 242, which allows a resilient flexible pivotability of the corresponding tongue 240, is formed on the abutment element 234 in the region of a tongue 240. The incision 242 is in each case arranged here on the abutment element 234 on an outside remote from the clamping jaw 106.

In a fixing position (top of FIG. 10), the counter-region 150 of the clamping jaw 106 is supported on the tongue device 238. As a result, a positive engagement with the loading device 60 is achieved.

A blocking device 244, which, in the fixing position of the tool 230 on the spindle 52, blocks the movability of the tongue device 238, is arranged on the tool.

The blocking device 244 comprises an operating device 246, on which the end face 155 of the spindle 52 can act. It furthermore comprises a support element 248, which is seated on the operating device 246, and, in this case, is seated in the fixing position between the tongue device 238 and a wall 250 surrounding the latter. A transverse movability in a direction 252 away from the rod 64 of the tool 230 is blocked by this support element 248. Thus, the fixing position is one in which the first abutment region 132 and the clamping jaw 106 abut the second abutment region 234 of the loading device 60.

It may be provided here that a raised portion 254, which additionally also pushes the tongue device 238 against the clamping jaw 106, is arranged on the support element 248.

The operating device 246 can be displaced forward by the end face 155 of the spindle 52 (FIG. 10, lower part II). As a result, the support element 248 is also displaced forward. The raised portion 254 can thus enter the incision 242. As a result, the tongue device 238 no longer presses on the clamping jaw 106. Moreover, the clamping jaw 106 can now push the tongue device 238 away from the loading device 60.

If the loading device 60 is correspondingly drawn back, the abutment between the first abutment region 132 and the second abutment region 134 is then cancelled and the clamping jaw can pivot out and, in this case, the counter-region 150 can enter an entry region 256 in front of the end face 236, in other words in front of the tongue device 238.

As a result, the positive engagement is released and the tool can be removed, or a position is provided, in which a tool 230 can be inserted.

The return movement of the support element 248 may, for example, take place by means of a spring loading.

The pull/push coupling device 82 according to the invention functions as follows:

In the fixing position 84 of the pull/push coupling device 82, which is shown at the top in FIGS. 4 and 5, the spring device 144 pushes the sleeve 136 in the direction of the spindle 52. The rod 64, with its entry region 100, penetrates the recess 90, the front end 88 abutting the end face 102. The first abutment region 132 of the gripping arms 122 abuts the second abutment region 134. The spring device 130 attempts to move the first abutment region 132 away from the second abutment region 134 by pivoting the corresponding gripping arms 122. The inside 146 of the sleeve 136 blocks this movement apart. A positive engagement is thereby achieved between the rod 62 and the rod 64 by the clamping jaw 106.

By linear displacement of the rod 62, the rod 64 is also displaced. Owing to the positive connection by means of the clamping jaw 106, a forward travel movement of the rod 62 in the feed direction 104 initiates a forward travel movement of the rod 64 here by exerting pressure thereon. By means of a return travel of the rod 62 in the return travel direction 110, the rod 64 is drawn in the return travel direction 110, brought about by means of the positive connection.

The end region 128 of the clamping jaw 106 slides here on the inside 146 of the sleeve. The clamping jaw 106 is displaced with the movement of the rod 62 and therefore the movement of the rod 64.

A working travel region is indicated in FIG. 5 by the reference numeral 186. This corresponds to the path between the positions 88b and 88c according to FIG. 4. The working travel region 186 is defined here toward one end in that the end region 128 of the clamping jaw 106 has just been removed from the entry region 148 with its counter-region 150 and is limited by the inside 146 of the sleeve 136 outside the entry region 148. The front end of the rod 62 is at 88b (FIG. 4).

The other end of the working travel region 186 is substantially defined by the displacement path of the rod 62 of the spindle 52.

The end of the working travel region 186 toward the spindle 52 (designated 188 in FIG. 5) allows a release of the tool 56 from the spindle 52 or an insertion of a tool 56 in the spindle 52. For this purpose, the rod 62 of the spindle 52 is displaced in such a way that it abuts with its front end 88 on the end 188 of the working travel region 186 (see, for example, bottom of FIG. 5; position 88b in FIG. 4). A force on the abutment element 154 in the feed direction 104 is then exerted on the tool 50 held on a tool release device by the spindle 52 as a whole (by translatory positioning thereof and pressure exertion by the end face 155). As a result, the sleeve 136 is displaced in the direction of the blocking device 140, until it abuts there. The tool release accordingly requires a force, which is greater than the force of the spring device 144.

As a result, the entry region 148 is displaced in such a way that it lies over the second abutment region 134 of the rod 62. The clamping jaw 106 can then pivot out with the end region 128 and thus, with the counter-region 150, enter the entry region 148. Further pivoting is blocked. The end region 128 of the clamping jaw 106 has then been removed from the recess 94 and no further positive engagement is produced.

If the rod 62 is now further displaced in the return travel direction 110, the entry region 100 of the rod 64 is removed from the recess 90 and a release of the tool 56 from the spindle 52 is achieved (position 88a in FIG. 4).

A coupling travel region 190 is thereby predetermined, which is indicated in FIG. 5 and which extends from the end 188 of the working travel region 186 to a position 192, in which the rod 64 has been removed from the rod 62 (region between the positions 88a and 88b according to FIG. 4).

The working travel region 186 is a workpiece machining travel region of the rod 62 of the spindle 52. The coupling travel region 190 of the rod 62 is a release region or fixing region to remove or insert a tool 56 on the spindle 52.

To insert a tool 56, the rod 62 is moved into the position 192 and the tool 56 is attached. The rod 62 is then moved in the feed direction 104 until the entry region 100 has been entered. The movement takes place here up to the end 188, in other words, until the front end 88 of the rod 62 abuts the end 188 of the working travel region 186. When no further force is exerted on the abutment element 154, the sleeve 136 is displaced because of the action of force of the spring device 184 against the abutment element 154 in the return travel direction 110. This means that the counter-region 150 is removed from the entry region 148 and the end region 128 is pushed into the recess 94. The end region 128 of the clamping jaw 106 abuts the inside 146 of the sleeve 136 and a positive engagement is achieved.

By displacing the rod 62 in the working travel region 186, the rod 64 is also displaced, both a pushing coupling and also a pulling coupling being achieved.

In the tool 230, the corresponding support device 232 has one or more movable elements, namely the tongue or tongues 240. This tongue or these tongues of the tongue device 238 form a delimiting device for an entry region 256. By releasing or blocking the transverse movability by means of the blocking device 244, a tool can be fixed or a release of a tool can be carried out.

LIST OF REFERENCE NUMERALS

- 10 machining center
- 12 machine bed
- 14 machine frame
- 16 tool carrier device
- 18a first spindle
- 18b second spindle
- 20a rotational axis
- 20b rotational axis
- 22 slide
- 24 slide guide
- 26 drive device
- 28 slide
- 30 slide guide
- 32 workpiece carrier
- 34 bearing device
- 36 tool
- 38 working space
- 40 tool changing device
- 41 control device
- 42 switch box
- 44 front side
- 46 rear side
- 48 auxiliary device
- 50 cleaning device
- 52 spindle
- 54 interface
- 56 tool
- 58 housing
- 60 loading device
- 62 rod (tool spindle)
- 64 rod (tool)
- 66 drive device
- 68 electric motor
- 70 ball screw
- 72 drive device
- 74 compressed air interface
- 75 cooling lubricant interface
- 76 air feed device
- 77 channel
- 79 supply device
- 80 spindle/tool combination
- 82 pull/push coupling device
- 84 fixing position
- 86 release position
- 88, 88a, b, c front end
- 90 recess
- 92 wall
- 94 recess
- 96 set-back region
- 98 axis
- 100 entry region
- 102 end face
- 104 feed device
- 106 clamping jaw
- 108 housing
- 110 return travel device
- 112 end region
- 114 main region
- 116 intermediate region
- 118 axis
- 120 receiving space
- 122 gripping arm
- 124 pivot axis
- 126 fixing region
- 128 end region
- 130 spring device
- 132 first abutment region
- 134 second abutment region
- 135 support device
- 136 sleeve
- 138 direction/counter-direction
- 140 blocking device
- 142 abutment face
- 144 spring device
- 146 inside
- 148 entry region
- 150 counter-region
- 152 end face
- 153 action device
- 154 abutment element
- 155 end face
- 156 clamping jaw
- 158 honing tool
- 160 honing stone retainer
- 162 cutting edge device
- 164 first wedge-shaped region
- 166 second wedge-shaped region
- 168 first region with wedge-shaped counter-bearing face
- 170 second region with wedge-shaped counter-bearing face
- 172 direction
- 174 opening
- 176 channel
- 178 opening
- 180 fine drilling tool
- 182 rod
- 184a, b cutting edge
- 186 working travel region
- 188 end
- 190 coupling travel region
- 192 position
- 200 tube
- 202 flange
- 204 seal
- 206 holding device
- 208 receiving space
- 210 wall
- 212 flange
- 214 seal
- 216 tube
- 218 receiving region
- 220 receiving region
- 222 holding balls
- 224 ability to reciprocate
- 230 tool
- 232 support device
- 234 abutment element
- 236 end face
- 238 tongue device
- 240 tongue
- 242 incision
- 244 blocking device 246 action device
248 support element
250 wall
252 direction
254 raised portion
256 entry region

The invention claimed is:

1. A spindle/tool combination for a machine tool, comprising:
a tool;
a spindle, to which the tool is releasably fixable and by means of which the tool is rotatable;
wherein the tool has at least one linearly movable rod and the spindle comprises a loading device, which acts on the at least one linearly movable rod of the tool, and a pull/push coupling device, by means of which the at least one rod of the tool is couplable to the loading device, the at least one rod being actuable by means of the loading device by pushing and pulling when coupled;
wherein the pull/push coupling device comprises a clamping jaw and the clamping jaw is arranged in the tool; and
wherein at least one of the tool and the spindle has a rigid tube or a moveably mounted tube for fluid coupling between the spindle and the tool.

2. The spindle/tool combination according to claim 1, wherein the loading device has at least one linearly movable rod, to which the at least one rod of the tool is couplable.

3. The spindle/tool combination according to claim 1, wherein the spindle comprises a drive device for the loading device.

4. The spindle/tool combination according to claim 1, wherein the tool comprises at least one tool element, which is adjustable by means of the at least one rod of the tool.

5. The spindle/tool combination according to claim 4, wherein the at least one tool element is or comprises a cutting edge or a cutting edge device.

6. The spindle/tool combination according to claim 1, wherein the tool comprises at least one cutting edge or cutting edge device, which is coupled to the at least one rod of the tool, the cutting edge or cutting edge device being adjustable transversely to a rotational axis of the tool by means of the at least one rod of the tool.

7. The spindle/tool combination according to claim 1, wherein the pull/push coupling device defines a fixing position, in which the loading device is braced with regard to pulling and pushing with the at least one rod of the tool.

8. The spindle/tool combination according to claim 7, wherein in the fixing position, an end face of the loading device abuts the at least one rod of the tool.

9. The spindle/tool combination according to claim 7, wherein in the fixing position, the at least one rod of the tool and the loading device are positively connected.

10. The spindle/tool combination according to claim 1, wherein the loading device has a recess and the at least one rod of the tool has a penetration region into the recess.

11. The spindle/tool combination according to claim 10, wherein a set-back region is arranged on an outside of a wall of the recess.

12. The spindle/tool combination according to claim 1, wherein at least one of the tool and the spindle has a rigid tube for fluid coupling.

13. The spindle/tool combination according to claim 1, wherein at least one of the tool and the spindle has a movably mounted tube for fluid coupling between the spindle and tool.

14. The spindle/tool combination according to claim 1, wherein the clamping jaw is connected to the at least one rod of the tool and is displaceable therewith.

15. The spindle/tool combination according to claim 1, wherein the clamping jaw has at least one pivotable gripping arm.

16. The spindle/tool combination according to claim 15, wherein the at least one gripping arm is pivotable about a pivot axis, which is oriented transverse to a movement direction of the at least one rod of the tool.

17. The spindle/tool combination according to claim 15, wherein the at least one gripping arm is spring-loaded, a spring force tending to pivot the at least one gripping arm away from an axis of the at least one rod of the tool.

18. The spindle/tool combination according to claim 1, wherein the clamping jaw has a first abutment region, which cooperates with a second abutment region of the loading device, wherein, when the at least one rod of the tool is coupled to the loading device, the first abutment region abuts the second abutment region and a positive engagement is produced.

19. The spindle/tool combination according to claim 18, wherein the first abutment region is formed by a widening on an end region of a gripping arm.

20. The spindle/tool combination according to claim 18, wherein the second abutment region is formed by a set-back region on the loading device.

21. The spindle/tool combination according to claim 1, wherein the tool has a support device, on which the clamping jaw is supported in a fixing position of the pull/push coupling device.

22. The spindle/tool combination according to claim 21, wherein the clamping jaw has a first abutment region, which cooperates with a second abutment region of the loading device, wherein, when the at least one rod of the tool is coupled to the loading device, the first abutment region abuts the second abutment region and a positive engagement is produced, and wherein in the fixing position, the first abutment region abuts the second abutment region and the support device provides a blocking face for the clamping jaw.

23. The spindle/tool combination according to claim 21, wherein the support device is at least one of movable and provided with one or more movable elements.

24. The spindle/tool combination according to claim 21, wherein the support device has or delimits an entry region for a counter-region of the clamping jaw, wherein in a fixing position of the pull/push coupling device, the counter-region is located outside the entry region and, in a release position of the pull/push coupling device, penetrates the entry region.

25. The spindle/tool combination according to claim 24, wherein, when the counter-region penetrates the entry region, a first abutment region of the clamping jaw does not abut a second abutment region of the loading device.

26. The spindle/tool combination according to claim 24, wherein the entry region or a limiting device of the entry region is movable.

27. The spindle/tool combination according to claim 21, wherein the support device has a sleeve, which is movable and, in particular linearly movable, on the tool.

28. The spindle/tool combination according to claim 27, wherein the sleeve is spring-loaded, a spring force tending to push the sleeve, in the fixing position of the pull/push coupling device, in the direction of the loading device.

29. The spindle/tool combination according to claim 27, comprising a blocking device for blocking a displaceability of the sleeve away from the loading device.

30. The spindle/tool combination according to claim 29, wherein a release position of the pull/push coupling device is defined by the sleeve abutting the blocking device.

31. The spindle/tool combination according to claim 27, wherein the sleeve has an end face, on which the spindle is effective to displace the sleeve by means of the spindle and, in particular, by means of an end face of the spindle.

32. The spindle/tool combination according to claim 21, wherein the support device has a tongue device with at least one tongue, which is movable transversely to a displacement direction of the rod.

33. The spindle/tool combination according to claim 32, wherein the tongue device delimits an entry region for the clamping jaw.

34. The spindle/tool combination according to claim 32, wherein arranged on the tool is a blocking device, on which the spindle is effective, in particular by means of an end face, in order to at least one of free and block the transverse movability of the at least one tongue.

35. The spindle/tool combination according to claim 34, wherein the blocking device comprises at least one support element, which is displaceable between the tongue device and a wall of the tool.

36. The spindle/tool combination according to claim 21, wherein the tool has an operating device for the spindle and in particular an end face of the spindle, by means of which, depending on the position of the spindle, an ability of the counter-region of the clamping jaw to penetrate the entry region is adapted to be at least one of freed and blocked.

37. The spindle/tool combination according to claim 36, wherein a movement or movability of the support device or a part of the support device is adapted to be effected by the operating device.

38. The spindle/tool combination according to claim 1, comprising a standard interface on the spindle for coupling the tool.

39. A spindle/tool combination for a machine tool, comprising:
a tool;
a spindle, to which the tool is releasably fixable and by means of which the tool is rotatable;
wherein the tool has at least one linearly movable rod and the spindle comprises a loading device, which acts on the at least one linearly movable rod of the tool, and a pull/push coupling device, by means of which the at least one rod of the tool is couplable to the loading device, the at least one rod being actuable by means of the loading device by pushing and pulling when coupled;
wherein the pull/push coupling device comprises a clamping jaw and the clamping jaw is arranged in the tool; and
wherein the loading device has a recess and the at least one rod of the tool has a penetration region into the recess.

40. The spindle/tool combination according to claim 39, wherein a set-back region is arranged on an outside of a wall of the recess.

41. A spindle/tool combination for a machine tool, comprising:
a tool;
a spindle, to which the tool is releasably fixable and by means of which the tool is rotatable;
wherein the tool has at least one linearly movable rod and the spindle comprises a loading device, which acts on the at least one linearly movable rod of the tool, and a pull/push coupling device, by means of which the at least one rod of the tool is couplable to the loading device, the at least one rod being actuable by means of the loading device by pushing and pulling when coupled;
wherein the pull/push coupling device comprises a clamping jaw and the clamping jaw is arranged in the tool;
wherein the tool has a support device, on which the clamping jaw is supported in a fixing position of the pull/push coupling device;
wherein the support device has a sleeve, which is movable and, in particular linearly movable, on the tool; and
wherein the sleeve has an end face, on which the spindle is effective to displace the sleeve by means of the spindle and, in particular, by means of an end face of the spindle.

42. A spindle/tool combination for a machine tool, comprising:
a tool;
a spindle, to which the tool is releasably fixable and by means of which the tool is rotatable;
wherein the tool has at least one linearly movable rod and the spindle comprises a loading device, which acts on the at least one linearly movable rod of the tool, and a pull/push coupling device, by means of which the at least one rod of the tool is couplable to the loading device, the at least one rod being actuable by means of the loading device by pushing and pulling when coupled;
wherein the pull/push coupling device comprises a clamping jaw and the clamping jaw is arranged in the tool;
wherein the tool has a support device, on which the clamping jaw is supported in a fixing position of the pull/push coupling device; and
wherein the support device has a tongue device with at least one tongue, which is movable transversely to a displacement direction of the rod.

43. A spindle/tool combination for a machine tool, comprising:
a tool;
a spindle, to which the tool is releasably fixable and by means of which the tool is rotatable;
wherein the tool has at least one linearly movable rod and the spindle comprises a loading device, which acts on the at least one linearly movable rod of the tool, and a pull/push coupling device, by means of which the at least one rod of the tool is couplable to the loading device, the at least one rod being actuable by means of the loading device by pushing and pulling when coupled;
wherein the pull/push coupling device comprises a clamping jaw and the clamping jaw is arranged in the tool;
wherein the tool has a support device, on which the clamping jaw is supported in a fixing position of the pull/push coupling device; and
wherein the tool has an operating device for the spindle and in particular an end face of the spindle, by means of which, depending on the position of the spindle, an ability of the counter-region of the clamping jaw to penetrate the entry region is adapted to be at least one of freed and blocked.

* * * * *